United States Patent
Kuhl et al.

(10) Patent No.: US 7,629,920 B1
(45) Date of Patent: Dec. 8, 2009

(54) ENTROPY METHOD FOR RANGE ALIGNMENT FOR INTEGRATION OF TARGET RETURNS

(75) Inventors: Parker L. Kuhl, Mount Laurel, NJ (US); Rao M. Nuthalapati, Delran, NJ (US); Harry Urkowitz, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 247 days.

(21) Appl. No.: 11/861,718

(22) Filed: Sep. 26, 2007

(51) Int. Cl.
*G01S 13/52* (2006.01)
*G01S 13/534* (2006.01)

(52) U.S. Cl. ............... 342/160; 342/90; 342/109

(58) Field of Classification Search ............... 342/90, 342/109, 160, 162
See application file for complete search history.

(56) References Cited

U.S. PATENT DOCUMENTS

| | | | |
|---|---|---|---|
| 5,235,338 A * | 8/1993 | Hsiao et al. | 342/109 |
| 6,018,311 A | 1/2000 | David | |
| 6,492,932 B1 | 12/2002 | Jin et al. | |
| 6,828,929 B2 | 12/2004 | Barbella et al. | |
| 7,450,057 B2 * | 11/2008 | Clark | 342/160 |

* cited by examiner

*Primary Examiner*—Ian J Lobo
(74) *Attorney, Agent, or Firm*—Duane Morris LLP

(57) ABSTRACT

The proper timing or alignment for coherent or noncoherent integration of radar pulses returned from a potentially moving target is determined by determining the entropy associated with sets of range samples based on a plurality of different velocity hypotheses. That set associated with the minimum entropy is deemed to be the correct velocity hypothesis, and integration is then performed using the velocity hypothesis so determined.

4 Claims, 8 Drawing Sheets

US 7,629,920 B1

ENTROPY METHOD FOR RANGE ALIGNMENT FOR INTEGRATION OF TARGET RETURNS

This invention was made with Government support under contract number N00024-03-C-6110 awarded by the Department of the Navy. The Government has certain rights in this invention.

FIELD OF THE INVENTION

This invention relates to range alignment of target return pulses, and more particularly to determination of range walk for optimizing integration of pulse returns from a moving target.

BACKGROUND OF THE INVENTION

FIG. 1 is a highly simplified block diagram of a prior-art pulse radar system 10. Radar system 10 includes a radar antenna 12 which is connected to a port of a transmit/receive (T/R) device 14. T/R device 14 receives recurrent guided-wave electromagnetic pulses to be transmitted from a transmitter (TX) 16, and couples the pulses to be transmitted to the antenna 12. Antenna 12 transduces the electromagnetic signals into unguided waves which propagate in free space toward a target region 18, as suggested by the "lightning" bolt symbol 20. If target region 18 contains a target, such as the illustrated airplane 22, some of the energy of each of the transmitted electromagnetic pulses is reflected toward the antenna 12, as known to those skilled in the radar arts. The reflected or return signal pulses are represented in FIG. 1 by the lightning bolt representation 24.

Reflected electromagnetic signal pulses returning to antenna 12 are transduced by the antenna into guided waves, which propagate to the transmit/receive device 14, and are routed by the transmit/receive device 14 to a receiver illustrated as a block 30. Receivers may perform all manner of functions, but some of the important functions include low-noise amplification and frequency downconversion of the return signal pulses. The receiver may also digitize the return signals in preparation for signal processing. The sampling required for digitization is represented in FIG. 1 by a block 31. Whether in analog or digital form, the received return signal pulses retain the original transmitted pulse timing, with the superposition of timing changes attributable to the radial motion (closing or receding) of the target 22 relative to the radar antenna 12. The radial speed of the target may be estimated or determined by comparing the Doppler shift of the return signals relative to the transmitted signals by means which are not illustrated.

The return signals must traverse the distance between the antenna 12 and the target, and the reflected signals must again traverse the distance from the target to the antenna 12. The signal in each of these two paths is subject to attenuation, as known, as the square of the distance. The combination of the forward and return paths is therefore attenuated by the fourth power of the distance. It will be appreciated that the signal strength of the return signal pulses is often very small.

A technique which has long been used to improve the extraction of pulse energy from return signals is pulse-to-pulse integration. The return pulses from the receiver 30 and sampling block 31 of FIG. 1 are illustrated as being applied to an integration block 32. In the case of a stationary target, the return signal pulses retain the inter-pulse temporal spacing or interval of the original transmitted pulses, which in the case of regular recurrent pulse transmissions is a constant. FIG. 2a is a plot 210 of the recurrent transmitted pulses, some of which are designated $210_1$, $212_2$, $212_3$, ..., with an interpulse period designated 210IP, and plot 212 of FIG. 2b shows the return pulses, some of which are designated $212_1$, $212_2$, $212_3$, .... In response to a transmitted pulse such as $210_3$ of FIG. 2a, the target reflects energy, which is received as a return pulse $212_3$ at some time $t212_3$ after the transmission of pulse $210_3$. In the case of a stationary or fixed target, the received return pulses can be mutually delayed by multiples of the known inter-pulse interval, and as many pulses can be integrated as may be desired to raise the integrated return signal amplitude to a value greater than the system or clutter noise, as illustrated in FIG. 2c. In FIG. 2c, return pulse $212_1$ is illustrated as being delayed for twice (2×) the transmitted inter-pulse period to produce delayed pulse $214_1$. Return pulse $212_2$ is illustrated as being delayed for one inter-pulse period (1×) to produce delayed pulse $214_2$. Return pulse $212_3$ is not delayed, as indicated by the "no delay" notation in FIG. 2c. The sum of the delayed pulses $212_1$ and $212_2$, and of the undelayed pulse $212_3$, is illustrated as integrated pulse 216, which has an amplitude which is greater than that of any one of the constituent pulses alone. This increased amplitude may raise the integrated pulse 216 above any unavoidable noise.

The inter-pulse temporal spacing of the return pulses is not a constant in the case of a moving target, so the simple expedient of mutually delaying the return pulses by multiples of a fixed time does not result in temporal superposition of the pulses. Without superposition of the return pulses, the integration to increase the target signal amplitude may not be as effective as desired, and the signal-to-noise ratio (SNR) may not meet requirements. The lack of a signal-to-noise improvement may result in generation of integrated pulses which do not exceed the noise level, failure to detect a target, or inability to accurately estimate the target's location.

Radial motion of a target results in "range walk" of the return pulses. That is to say, that the target return pulses do not arrive at the radar antenna 12 with a timing equal to the inter-pulse spacing of the transmitted pulses. Instead, for a target with radial motion toward the radar antenna, each succeeding return pulse will arrive somewhat earlier, relative to the corresponding transmitted pulse, than the previous return pulse. The increasingly earlier relative time of arrival results from progressive reduction in the distance between the radar antenna and the target in the case of radial motion toward the radar antenna. In the case of a target radially receding from the radar antenna, successive return pulses from the target arrive progressively later, since the transmission and return distances are increasing. A method that has been used in the prior art for integration of pulses from a moving target is to perform a plurality of pulse integrations on a train of return pulses, with each pulse integration based upon the assumption or hypothesis that the target has a particular value of radial motion. FIG. 1 illustrates the application to integration block 32 of various closing speed (radial velocity) hypotheses from a block 34. Integration block 32 performs a plurality of return pulse integrations, each with a different closing speed hypothesis. It will be clear that the amplitude of the integrated pulse will be at a maximum when the hypothesized closing speed is closest to being correct. Block 36 of FIG. 1 represents selection of the greatest or largest integrated amplitude from among the results of these many integrations as being indicative of the correct closing speed hypothesis, and the integrated value of return as being representative of the target.

In the presence of clutter or strong noise, or in the case of weak target return pulses, the noise level may undesirably affect the perceived maximum value of the correctly integrated signal. In this case, the clutter or noise level may adversely affect the determination of closing speed.

An alternative or improved method is desired for determination of the closing speed of a target based on integrated return pulses.

SUMMARY OF THE INVENTION

A method according to an aspect of the invention is for at least one of detecting and locating a target by the use of radar. The method comprises the steps of transmitting electromagnetic pulses toward a region to be examined, and receiving return pulses from a target. Each of the return pulses is sampled in time. Each sample has a corresponding range based on the time of the sample, to thereby generate a plurality of pulses, each including a plurality of different range samples. A set of target speeds is assumed. For each of the assumed target speeds, the amount of temporal (range) shift which should occur between each of the return pulses is determined, to thereby generate plural sets of return pulses with mutual delays, where the mutual delays of each set of return pulses expresses one of the assumed target speeds. The signals at each range sample are integrated over a set of return pulses, to thereby generate a set of integrated range samples for each assumed target speed. The values of each of the integrated range samples are normalized for each assumed target speed, to thereby generate normalized integrated range samples. For each of the assumed target speeds, entropy is calculated from the normalized integrated range samples for each assumed speed, to thereby generate an entropy value for each assumed speed. That speed estimate resulting in the set of normalized integrated range samples expressing the minimum value of entropy is determined. At least one of the presence and location of the target is determined by integrating the return pulses using the speed estimate associated with the minimum value of entropy.

A method for detecting a target by the use of radar according to another aspect of the invention comprises the steps of transmitting electromagnetic pulses toward a region to be examined, and receiving return pulses from a target. Each of the return pulses is sampled in time. Each sample has a corresponding range based on the time of the sample, to thereby generate a plurality of pulses, each including a plurality of different range samples. A set of target speeds is assumed. For each of the assumed target speeds, the amount of temporal (range) shift which should occur between each of the return pulses is determined, to thereby generate plural sets of return pulses with mutual delays, where the mutual delays of each set of return pulses expresses one of the assumed target speeds. The value of each range sample of each pulse is normalized for each assumed target speed, to thereby generate normalized range samples. For each reference range, an entropy is calculated from the sampled amplitudes of each set of mutually delayed return pulses. That speed estimate resulting in the set of delayed range samples expressing the minimum value of entropy is determined. The presence or non-presence of a target at each reference range is determined by integrating the signal amplitudes over the set of return pulses delayed using the speed estimate associated with the minimum value of entropy. In a mode of this method, the steps of calculating an entropy and integrating the signal over the set of return pulses are performed using the amplitude of each range sample, as opposed to complex range sample values consisting of or including both amplitude and phase information.

A method according to another aspect of the invention is for detecting a target by the use of radar. The method comprises the steps of transmitting electromagnetic pulses toward a region to be examined, and receiving return pulses from a target. Each of the return pulses is sampled in time. Each sample has a corresponding range based on the time of the sample, to thereby generate a plurality of pulses, each including a plurality of different range samples. A set of target speeds is assumed. For each of the assumed target speeds, the amount of temporal (range) shift which should occur between each of the return pulses is determined, to thereby generate plural sets of return pulses with mutual delays, where the mutual delays of each set of return pulses expresses one of the assumed target speeds. The value of each range sample of each pulse for each assumed target speed is normalized, to thereby generate normalized range samples. For each reference range, an entropy is calculated from the complex (amplitude and phase) samples of each set of mutually delayed return pulses. That speed estimate resulting in the set of delayed range samples expressing the minimum value of entropy is determined. The presence or non-presence of a target at each reference range is determined by integrating the complex signals over the set of return pulses delayed using the speed estimate associated with the minimum value of entropy.

DESCRIPTION OF THE INVENTION

Figure 1:
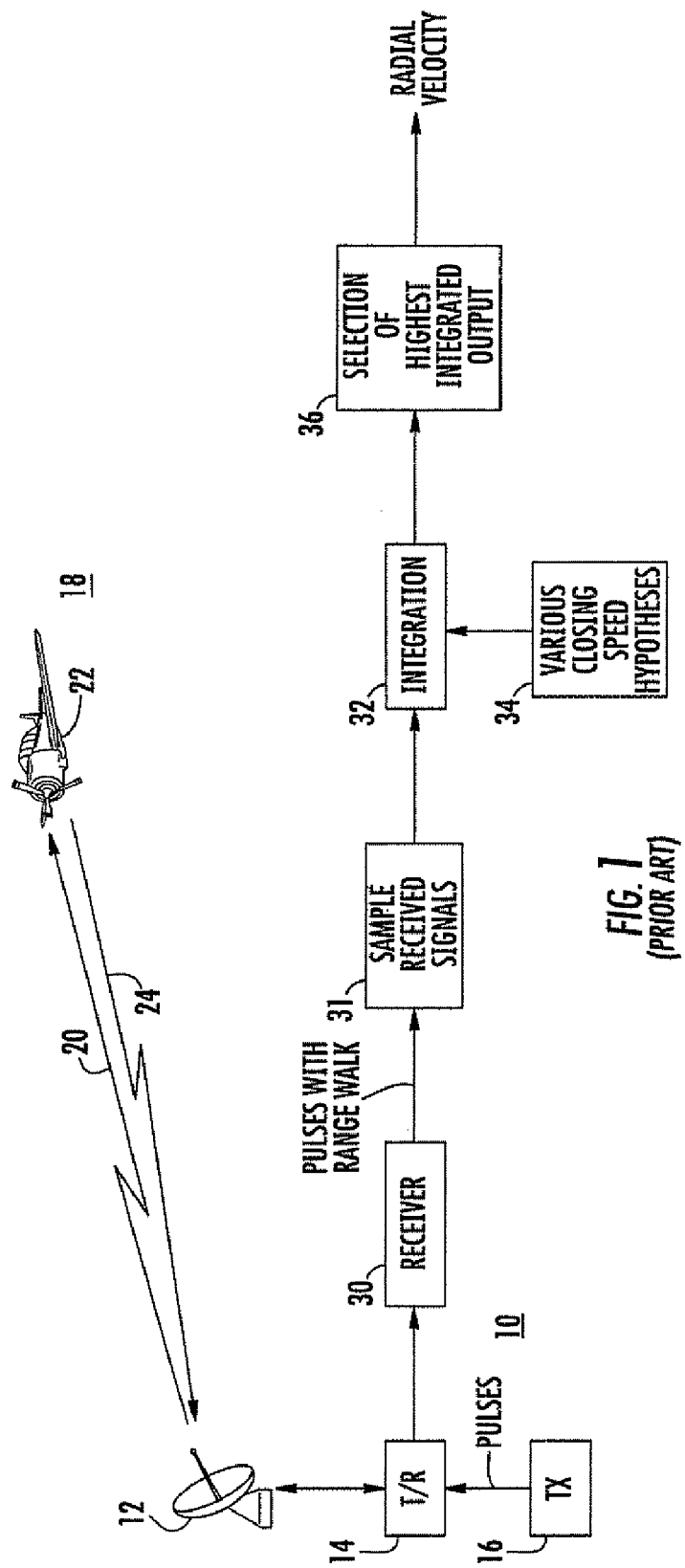
FIG. 1 is a highly simplified block diagram of portions of a prior-art pulse radar system.
Figure 2:
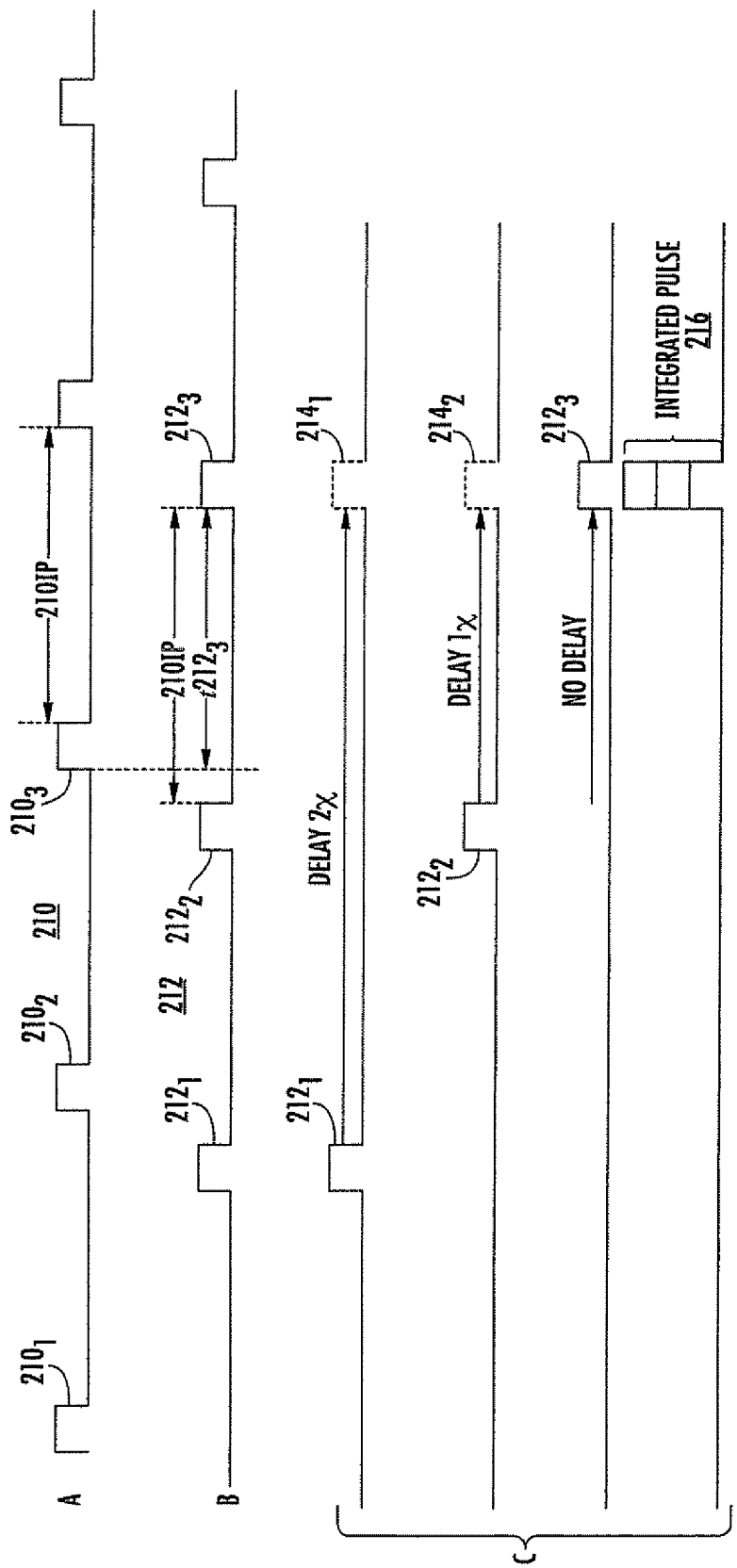
FIGS. 2a, 2b, and 2c represent plots of return pulse amplitude versus time for the arrangement of FIG. 1.

The invention includes three aspects for using the concept of entropy to improve target detection capability by estimating target closing speed and properly aligning multiple return pulses from one or more targets. The three aspects include 1) a noncoherent process for a single target, 2) a noncoherent process for one or more targets, and 3) a coherent process for one or more targets.

The concept of entropy arose in thermodynamics. It was recognized that when heat is used to produce useful work, no machine can be made to be completely efficient, i.e., it cannot be made to regain the energy that is expended in doing work. Some energy is inevitably lost through heat. Although total energy is preserved (i.e., constant), some is lost through heat, friction, and the like. This lost ability was encompassed in the term "entropy". After statistical theory was applied to thermodynamics, entropy was given a statistical interpretation.

This interpretation applies the term "entropy" to a statistical distribution, i.e., to a probability density function or to a set of discrete probabilities in the discrete case. A set of events is of greater dispersion or "disorder" if the probabilities have greater spread. Entropy measures this spread. A statistical definition of entropy considers the case of discrete events, each with a discrete probability $p_i$ $$p_i, i=1, 2, \ldots, N_e \quad (1)$$

where:
$p_i \geq 0$; and $$\sum_{i=1}^{N_e} p_i = 1 \quad (2)$$

The set of values in expression (1) is sometimes termed the probability distribution of the set of events indexed by the index i. The entropy S of this set of events, or of the probability distribution (1) is defined by $$S = -\sum_{i=1}^{N_e} p_i (\log p_i) \quad (3)$$

The particular logarithmic base is of no consequence; different bases lead to definitions that are proportional.

Entropy is a measure of disorder. To show that entropy measures the disorder or spread of the set of values of a random variable, consider two extremes for the set of probabilities $p_i$ Case 1.

$$P_i = 1, i = i_0 \quad (4)$$
$$= 0, \text{ otherwise}$$

That is, only one value of the random variable can be realized and it always occurs. If case 1, equation (4) is put into equation (3), the result is $$S=0 \quad (5)$$

This indicates "perfect orderliness", or no "spread" of values.

Case 2.

$$p_i=1/N, \text{ all } i \quad (6)$$

That is all values of the random variable are equally probable. In this case, equation (3) will show that $$S=\log N \quad (7)$$

Thus, large N means greater disorder or "spread". Equations (5) and (7) are the extremes for the entropy of a distribution.

Entropy as a measure of disorder or "spread" can be applied to any arbitrary set of numbers, real or complex. In fact, the concept can be applied to any set of quantities or properties that can be counted. They need not be values of a random variable. The only requirement is that means be available for counting the number having a given value or a given property. Then the "count" for each value or property can be made, by normalization, to have the properties of a probability. This can be shown by denoting the value or property of some quantity by $A_i$, where i denotes or indexes the property. Then let $n_i$ denote the number having this property. The relative or normalized number having this property is $$\text{relative number} = n_i \bigg/ \sum_{i=1}^{N} n_i \Delta P_i \quad (8)$$

where N is the total number of objects. Then, using $p_i$ of equation (8) in equation (3), the entropy of the set of properties can be defined. Note that $p_i$ is here defined as "relative frequency" and has the properties of probability.

From a statistical point of view, a pair of random variables $x_i, y_k, i=1, \ldots, N; k=1, \ldots, N$ is characterized by their joint probability distribution function $$p(x_i, y_k) \quad (9)$$

and, of course, $$\sum_{k=1}^{N} \sum_{i=1}^{N} p(x_i, y_k) = 1 \quad (10)$$

In such a case the entropy (i.e. joint entropy) of these two random variables is given by $$S = -\sum_{k=1}^{N} \sum_{i=1}^{N} p(x_i, y_k) \log[p(x_i, y_k)] \quad (11)$$

In the case of pairs, too, entropy measures disorder in a set of pairs of random variables. To show this, let $$p(x_i, y_k) = 1, i = 0, k = 0 \quad (12)$$
$$= 0, \text{ otherwise}$$

Then (11) become $$S=-p(x_0,y_0)\log[p(x_0,y_0)] \quad (13)$$

Using (12) this yields $$S=0 \quad (14)$$

On the other hand, of the $N^2$ pairs of $x_i, y_k$, they will have greatest spread or disorder if the all have the same value $1/N^2$. In this case, we have $$p(x_i, y_k) = \frac{1}{N^2}, \text{ all } i, \text{ all } k \quad (15)$$

Then $$s = -\sum_{k=1}^{N} \sum_{i=1}^{N} \frac{1}{N^2} \log(1/N^2) \quad (16)$$
$$= -\frac{\log(1/N^2)}{N^2} \sum_{k=1}^{N} \sum_{i=1}^{N} = \log(N^2) = 2\log(N)$$

This represents the greatest disorder. As in the case of a single random variable if all of the possible pairs are concentrated at one value, the entropy is zero. This represents least disorder. On the other hand, if the spread or disorder is greatest, the entropy is largest.

As stated above, entropy measures the disorder in a set of numbers, whether these be real or complex. They need not be random variables. Let us consider a set a complex numbers, described by their real and imaginary parts, $x_i$: sequence of real parts, i=1, ..., N
$y_i$: sequence of imaginary parts, i=1, ..., N The sequence of pairs, then, is displayed as follows:

$$x_1, y_1 \quad (17)$$

$$x_2, y_2$$

$$\vdots$$

$$x_N, y_N$$

We approach the determination of regularity of the sequence pair by seeking the regularity of each member of the pair. To this end, we define the relative frequency of the x values by defining $$px(x_i) = \frac{x_i}{\sum_{i=1}^{N} x_i} \quad (18)$$

and of the y values by defining $$p_y(y_k) = \frac{y_k}{\sum_{i=1}^{N} y_i} \quad (19)$$

The entropy of the pair sequence (17) is defined by $$S = -\sum_{k=1}^{N}\sum_{i=1}^{N} p_Y(y_k) p_X(x_i) \log[p_Y(y_k) p_X(x_i)] \quad (20)$$

This approach may be tested for its extreme values. Let $$x_i = 1, i = 0 \quad (21)$$
$$= 0, \text{otherwise}$$
$$y_k = 1, k = 0$$
$$= 0, \text{otherwise}$$

Then (18) and (19) become $$p_x(x_1) = 1, \; i = 0 \quad (22)$$
$$= 0, \text{otherwise}$$
$$p_y(y_k) = 1, \; k = 0$$
$$= 0, \text{otherwise}$$

Then (20) is $$S = -(1)(1)\log[(1)(1)] = 0 \quad (23)$$

Going to the other extreme, let $$x_i = 1/N, \text{all i}$$

$$y_k = 1/N, \text{all k} \quad (24)$$

(20) becomes $$S = -\sum_{k=1}^{N}\sum_{i=1}^{N} \left(\frac{1}{N}\right)\left(\frac{1}{N}\right)\log\left(\frac{1}{N^2}\right) = \frac{N^2}{N^2}\log(N^2) = 2\log(N) \quad (25)$$

One may ask: What has this to do with probability? The answer is: It doesn't; by analogy with the connection of entropy, It is used to express the orderliness or disorderliness of specific sequences. (23) expresses the extreme (i.e., maximum) orderliness of a pair sequence while (24) expresses the minimum orderliness of a pair sequence. If we compare (25) with (7) we see that both express extreme disorder in a sequence, whether of single numbers or of pairs of numbers. This is the way sequences of complex numbers will be treated, each complex number being a pair of real numbers.

Figure 3:
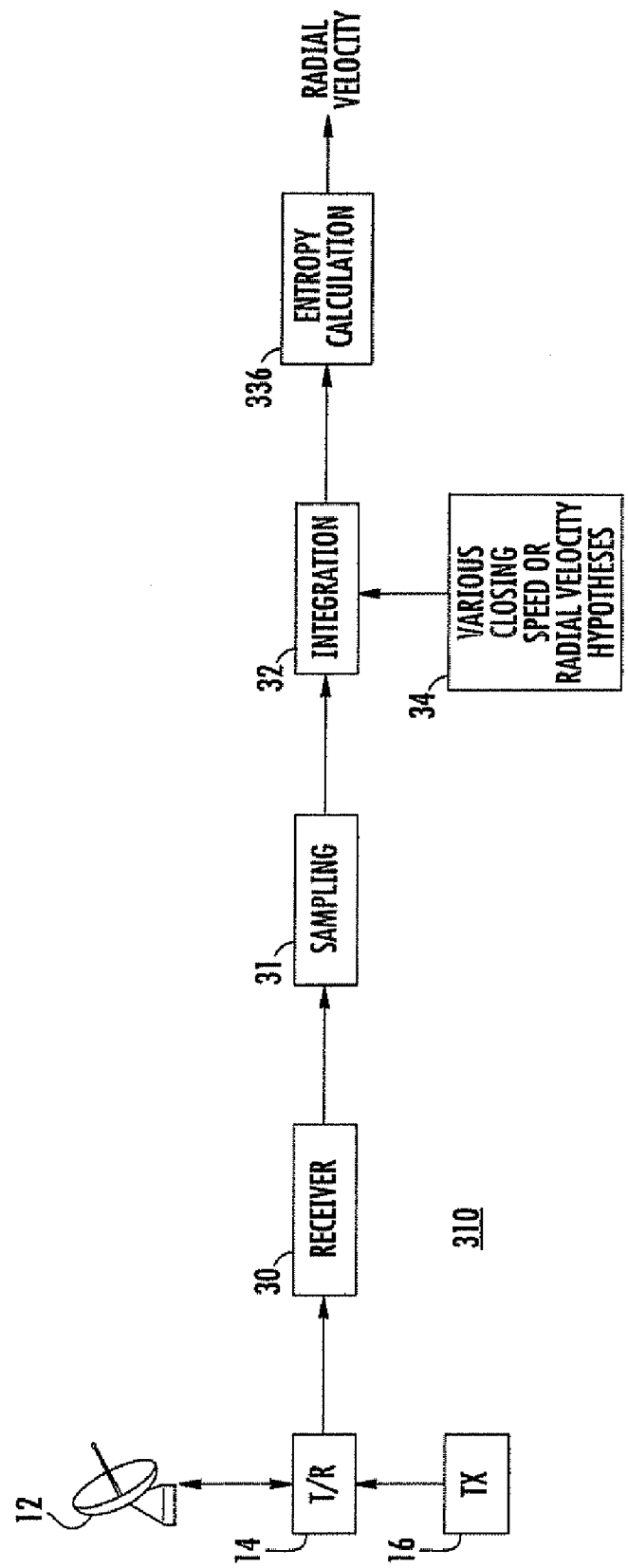
FIG. 3 is a highly simplified block diagram of portions of a radar system according to an aspect of the invention.
Figure 4:
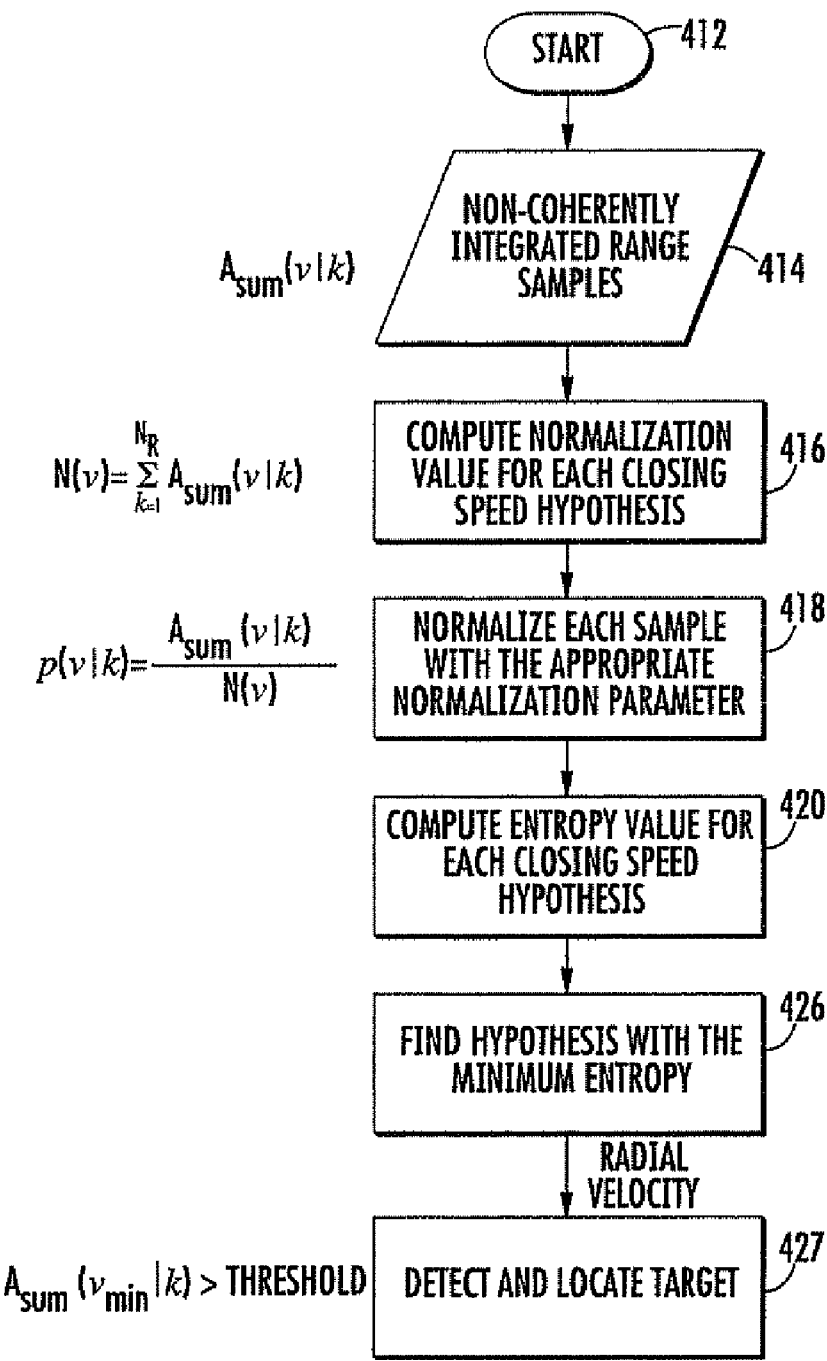
FIG. 4 is a simplified logic flow chart or diagram illustrating the processing associated with speed estimation of a single target by noncoherent integration using entropy in the arrangement of FIG. 3.
Figure 5:
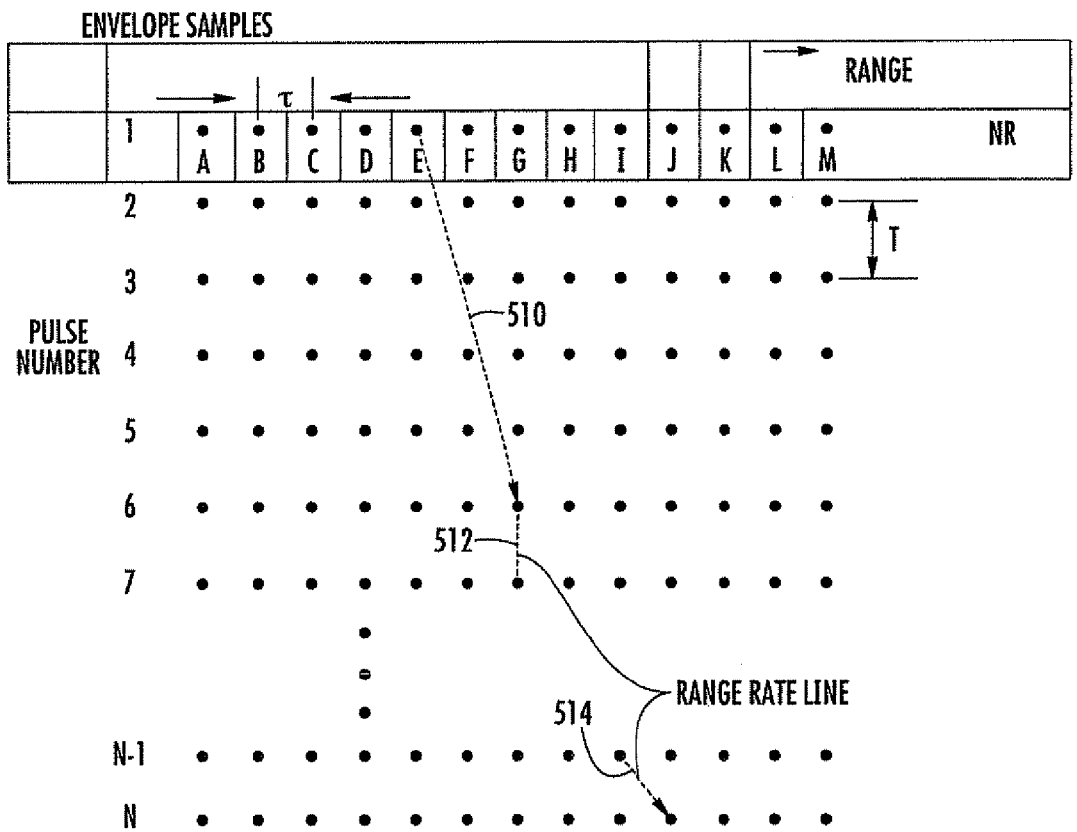
FIG. 5 is a simplified pattern or plot of compressed signal envelope samples for explaining range-rate lines.

The targets faced in radar, of course, have motion. It is desirable to integrate or "build up" echo strengths from pulse to pulse over a sequence of pulse echoes. The success of such buildup or "integration" will depend upon how closely the closing speed of the target is matched in the processing method. The maximum build up is obtained if the hypothesized closing speed equals the actual closing speed. The process of doing this, applied only to the envelopes or amplitudes of the echoes, is illustrated in FIG. 5, where noncoherent addition (integration) is implied, so that samples of envelope (or squared envelope) are added from pulse to pulse following a hypothesized closing speed. Note that a starting or reference range is implied for each sequence of N samples (one sample from each pulse) that enter into the integration process. There is one sequence for each of the hypothesized closing speeds. Thus, each reference range gives rise to a number N of samples for each hypothesized closed speed v. One such sequence of N samples for one specific starting or reference range and for a specific closing speed v is illustrated in FIG. 5. One such hypothesis is illustrated in FIG. 5. In FIG. 5, each numbered pulse 1, 2, 3, 4, 5, 6, 7, ... N−1, N is associated with a plurality of range samples A, B, C, D, E, F, G, H, I, J, K, L, and M. Each range sample for each pulse is illustrated as being occupied by a dot. While a dot represents a return signal, it will be recognized that not all range samples will actually have a target return. An illustrative straight dashed range rate line portion 510 extends from pulse 1, range sample E of FIG. 5 to pulse 6, range sample G, representing a constant radial speed away from the radar. The range rate line breaks to a different, lesser speed portion 512 between pulses 6 and 7, as evidenced by the lesser slope in that region. In the region between pulses N−1 and N, the range rate line portion 514 represents a greater receding speed, as evidenced by the greater slope in that region. For each range rate hypothesis v, starting with a specific reference k, the sequence of amplitudes (or squared amplitudes) from pulse to pulse is indexed as follows:

$$A(i:v|k) \quad (26)$$

where:

i=1, 2, ..., N, N=number of pulses k=1, 2, ..., $N_R$, $N_R$=number of range samples v=1, 2, ..., V, V=number of closing speed hypotheses The noncoherent process for a single target is illustrated in FIG. 3 and described in more detail by the flow chart in FIG. 4. The arrangement of FIG. 3 is similar to that of FIG. 1, and corresponding portions are designated by like reference alphanumerics. As in the arrangement of FIG. 1, the integration block 32 receives various hypotheses as to the closing speed, and performs a plurality of integrations of the return pulses, one for each hypothesis. Instead of determining the correct hypothesis based on the amplitudes of the integrated pulses, as described in conjunction with FIG. 1, an entropy calculation is performed in block 336. This entropy calculation results in reliable determination of the velocity of the target regardless of whether the largest integrated return pulse signal is attributable to clutter or noise.

According to an aspect of the invention, the determination of the best alignment of the pulses for noncoherent integration is performed using the integrated signal or pulse values corresponding to the various closing speed hypotheses. For this purposes, some finite subset of pulses must be evaluated. A "rolling" or "vanishing" subset of the pulses is often used for such calculations. The entropy value for each hypothesis is computed. If individual return pulses are misaligned after the timing correction, the integrated signal will be spread out over many range samples, and the entropy will be large. "Proper" alignment of the timing-adjusted return pulses concentrates the integrated energy to one or a few range samples, so the spread is small, and the entropy is also small. The best alignment of the pulses results in integrated values having the lowest entropy. For the case of a moving target with consistent- or constant-amplitude return signals in the presence of fluctuating clutter, which may also be moving, the minimum-entropy criterion is able to discriminate against the clutter returns in order to determine the proper alignment of the target returns. Because the clutter returns are randomly fluctuating in amplitude over their range extent, integrating effectively filters out much of the pulse-to-pulse variation that may occur in individual returns such that the integrated signal becomes smooth, broad and spread out over multiple range samples, regardless of the accuracy of the alignment. The same smoothing occurs when misaligned target returns are integrated. Integrating misaligned returns spreads the target returned energy over several range samples. However, when properly aligned, integrating enhances the amplitude and detectability of the target. Thus, the integrated clutter return is relatively broad and does not vary significantly with the temporal alignment of the return pulses. The integrated target returns, however, do change in spread and entropy in response to the temporal alignment, with the entropy decreasing with increasing alignment accuracy. This means that the portion of the integrated signal attributable to clutter is less dependent upon the temporal alignment than the portion due to the target. Since the primary change in the entropy is due to the target returns, the minimum entropy identifies the best temporal alignment of the target pulses, and therefore also identifies the closest match to the target closing speed. This allows the correct target velocity to be determined without requiring that the integrated target return exceed the clutter.

For each of the range rate hypotheses the sequence of amplitudes of equation (26) is summed to produce the noncoherent sum, arbitrarily designated $A_{sum}(v|k)$ $$A_{sum}(v|k) = \sum_{i=1}^{N} A(i:v|k); k = 1, \ldots, N_R; v = 1, \ldots, V. \quad (27)$$

There will be one such sum for each combination of range sample k along each range trace and closing speed hypothesis v. The starting index i=1 can refer to any of the pulses in the burst of N, to be taken as the starting or reference pulse. It is often taken as the last pulse trace in the group of N. It may be called the "reference pulse". Thus, over the values of k, the range samples along a range trace, the sum of equation (27) measures the relative frequency of A(i: v|k). To make the sum in equation (27) into a true relative frequency, the sum is normalized over the values of k. Equation (27) shows that $A_{sum}(v|k)$ is a function of k (range sample) and v (closing speed hypothesis). To find the relative frequency of $A_{sum}(k,v)$, equation (27) is divided by $$N(v) = \sum_{k=1}^{N_R} A_{sum}(v|k) \quad (28)$$

and the quotient is denoted by p(v|k)

$$p(v|k) = \frac{A_{sum}(v|k)}{\sum_{k=1}^{N_R} A_{sum}(v|k)} \quad (29)$$

Equation (29) gives p(v|k) the properties of a true relative frequency for a given pair: range sample k and closing speed v and therefore is a measure of the probability of the pair (k, v)

FIG. 4 is a simplified logic flow chart or diagram illustrating processing to determine closing speed of a single target according to an aspect of the invention. In FIG. 4, the logic 410 begins at a START block 412, and flows to a further block 414, which represents the loading or acquisition of the integrated range samples according to equation (27) for all of the available velocity hypotheses. To give the amplitudes $A_{sum}$(v|k) the properties of a relative frequency (probability), they must be normalized. Block 416 of FIG. 4 represents computation of a normalization value for each velocity hypothesis. In the processing associated with block 416, the normalization parameter in equation (28) is computed for each velocity hypothesis by summing the amplitude values from that hypothesis only.

From block 416 of FIG. 4, the logic flows to a block 418. Block 418 represents the division of each amplitude of equation (27) by its corresponding normalization parameter (i.e. $A_{sum}(k,3)$ is divided by N(3)) to determine the normalized amplitudes in equation (29). The p(v|k) values have the properties of a probability, so now an entropy value can be calculated for each closing speed hypothesis.

From block 418 of FIG. 4, the logic flows to a block 420, which represents calculation of an entropy value for each current closing speed hypothesis using the sum:

$$S(v) = -\sum_{k=1}^{N_R} p(v|k) \log p(v|k); v = 1, \ldots, V \quad (30)$$

Note that, because the entropy value is calculated for each closing speed hypothesis, the amplitudes $A_{sum}(v|k)$ are normalized based only on the values associated with one specific closing speed hypothesis. Also, note that the sum N(v) is independent of v, because varying v only "repositions" the initial compressed pulse samples, but does not change their values. This is explained physically by the fact that each noncoherently integrated range profile contains the same amount of energy regardless of the velocity compensation performed on individual pulses.

From block 420 of FIG. 4, the logic flows to a block 426. Block 426 represents comparison of the entropy values for all of the velocity hypotheses to determine the lowest or smallest entropy value. The smallest value of entropy represents the greatest order, and therefore represents that velocity hypothesis which is closest to the actual value. This velocity hypothesis is deemed to be correct. With the correct closing speed hypothesis in hand, the logic flows to a block 427, which represents the detection and location of the target using pulses integrated using the range walk corresponding to the velocity determination. The sum $A_{sum}(v_{min}|k)$ is calculated and compared in block 724 with a noise threshold to control the false alarm probability $A_{sum}(v_{min}|k)$>threshold→detect $A_{sum}(v_{min}|k)$<threshold→reject The value of the threshold may be determined empirically or by simulation.

The above described aspect of the invention relates entropy to noncoherent correction of radar range walk for a single target. The same general considerations can also be applied to noncoherent integration when multiple targets exist.

Figure 6:
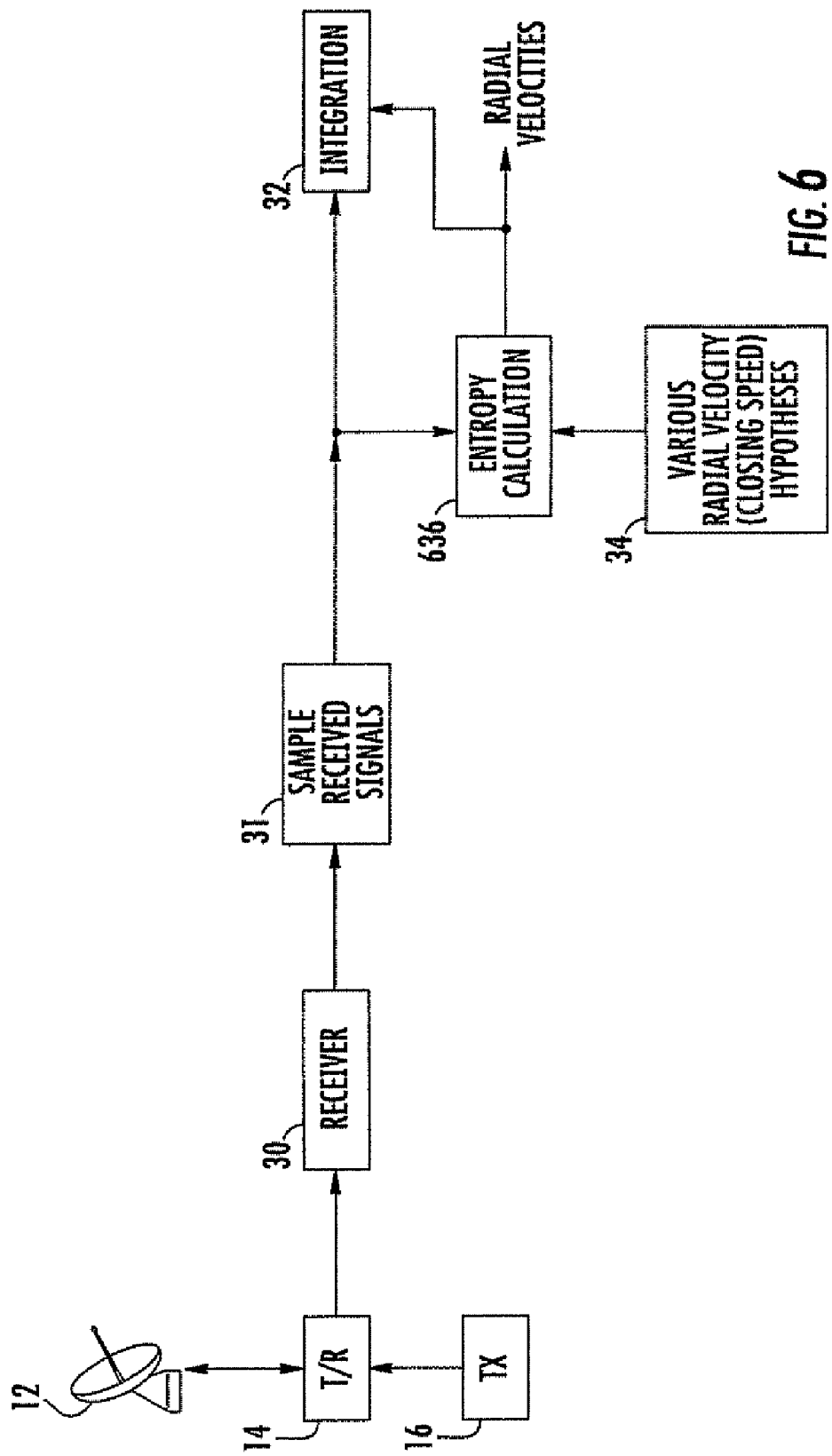
FIG. 6 is a highly simplified logic flow chart or diagram illustrating the processing associated with noncoherent integration using entropy in the arrangement of FIG. 3 and in the presence of multiple targets.
Figure 7:
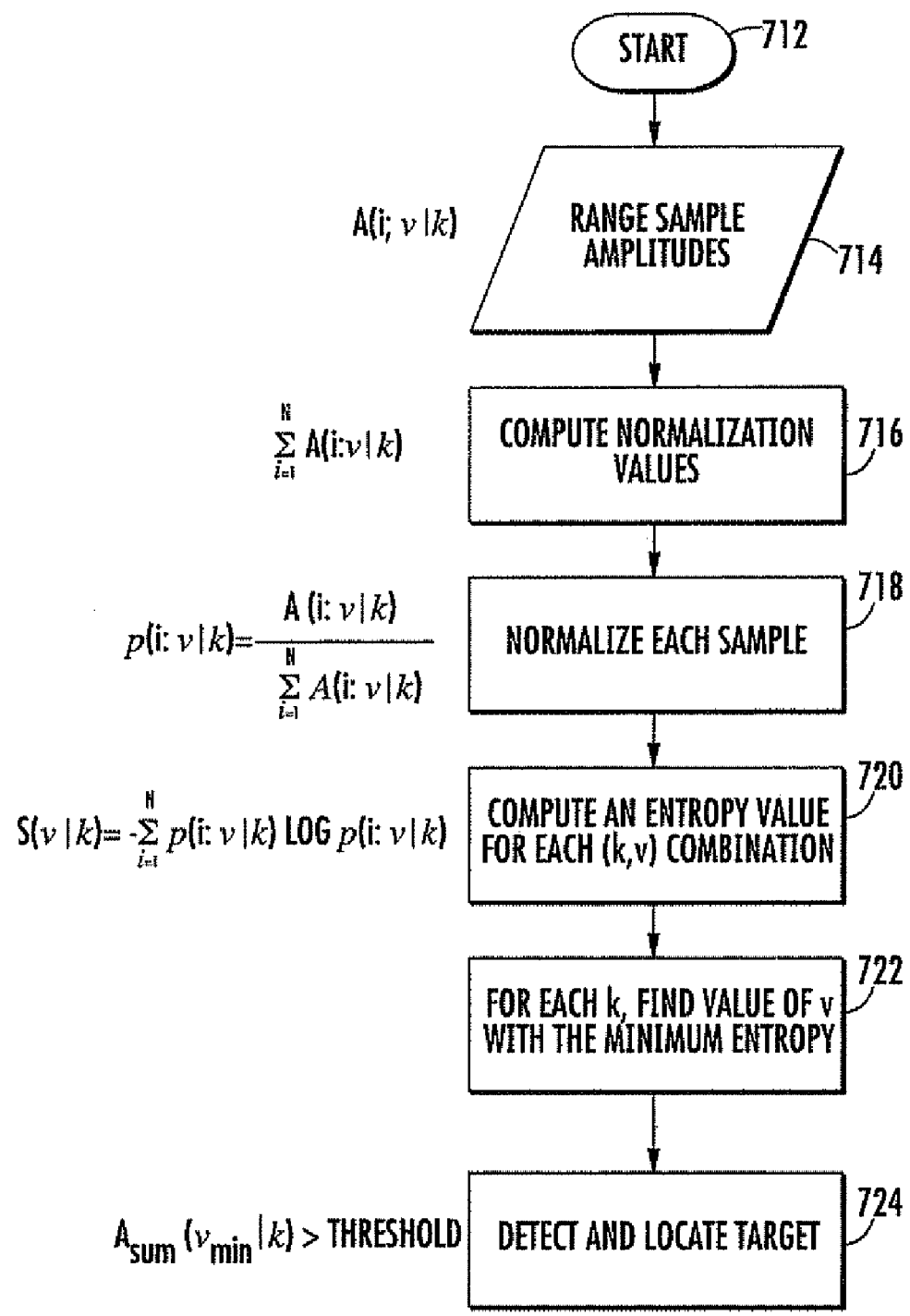
FIG. 7 is a simplified logic flow chart or diagram illustrating the processing associated with noncoherent integration in the presence of multiple targets.

It is possible to determine the radial velocities when multiple targets are present. FIG. 6 is a simplified block diagram of a portion of a radar system in which this aspect of the invention may be applied. In FIG. 6, the pulses as produced at the output of the receiver 30 and sampler 31, and an entropy calculation function illustrated as a block 636 is performed before pulse-to-pulse integration. The entropy calculation performed in block 636 is aided by the availability of a plurality of closing speed hypotheses from a block 734. The pulse-to-pulse integration is illustrated as occurring in block 32. Block 636 performs calculations expressed in the logic flow chart or diagram of FIG. 7. In FIG. 7, the logic begins at a START block 712, and flows to a block 712, which represents acquisition of the range samples of all pulses with various hypothesized velocity alignments prior to pulse-to-pulse integration. The sample amplitudes are the same as equation (26)

A(i;v|k)

where:
i=1, 2, ..., N; N is the number of pulses
k=1, 2, ..., $N_R$; $N_R$ is the number of range samples
v=1, 2, ..., V; V is the number of closing speed hypotheses.

If the correct value of v is chosen in equation (10) for a given range sample k, based on a particular value of v, any more or less steady target echo will tend to have values of A (i:v|k) that vary little over the pulses. That is, A (i:v|k) will vary little as i varies from i=1 to i=N. Stated in another way, A(i:v|k) will tend to concentrate around a single value as the index i goes from 1 to N.

From block 714 of FIG. 7, the logic flows to a block 716, representing computation of the value of a normalization parameter $$\sum_{i=1}^{N} A(i:v|k) \tag{31}$$

and the logic then flows to a block 718, which represents normalizing each sample $$p(i:v|k) = \frac{A(i:v|k)}{\sum_{i=1}^{N} A(i:v|k)} \tag{32}$$

From block 718, the logic of FIG. 7 flows to a block 720, which represents computation of an entropy value for each (k,v) combination by $$S(v|k) = -\sum_{i=1}^{N} p(i:v|k) \log p(i:v|K) \tag{33}$$

That value of v that minimizes S(v|k) is selected in block 722 as being the correct closing speed hypothesis for the range that is associated with the value of k. Thus the correct closing speed hypothesis is given by $$v_{min} = \min_v S(v|k) \tag{34}$$

Knowing the value of vmin does not complete the process because every range sample may not have a true target. Even in the presence of noise alone, some choice of v will yield a minimum for S. Therefore, some sort of noise threshold must be established. We must establish the probability that the minimum value of S in the presence of noise alone will not fall below a threshold determined by the allowable false alarm probability. The determination of the minimum value of S must be established empirically or by simulation. So, for target detection, the sum $$\sum_{i=i}^{N} A(i:v_{min}|k) \approx A_{sum}(v_{min}|k) \tag{35}$$

is calculated and compared in block 724 with a noise threshold to control the false alarm probability $A_{sum}(v_{min}|k)$>threshold→detect $A_{sum}(v_{min}|k)$<threshold→reject The value of the threshold may be determined empirically or by simulation.

Coherent pulse processing can also be used according to an aspect of the invention. The noncoherent integration described above in relation to FIGS. 6 and 7 used only the magnitudes (or squared magnitudes) of the radar echoes. The range alignment for closing target motion was based upon the pulse to pulse echo magnitudes. Since closing speed gives rise to Doppler frequency, it is desirable to use such information, if it can be obtained, to improve target detection, and, perhaps, get both finer range alignment and finer estimation of closing speed. This is accomplished, essentially, by substituting pulse to pulse complex envelopes for envelope magnitudes in the integration. The necessary real quantities to define relative frequency of occurrence are obtained by taking the magnitudes of coherent sums. Also, the coherent sums use ordinary Discrete Fourier Transforms (DFT) so that no unusual processing is involved.

Figure 8:
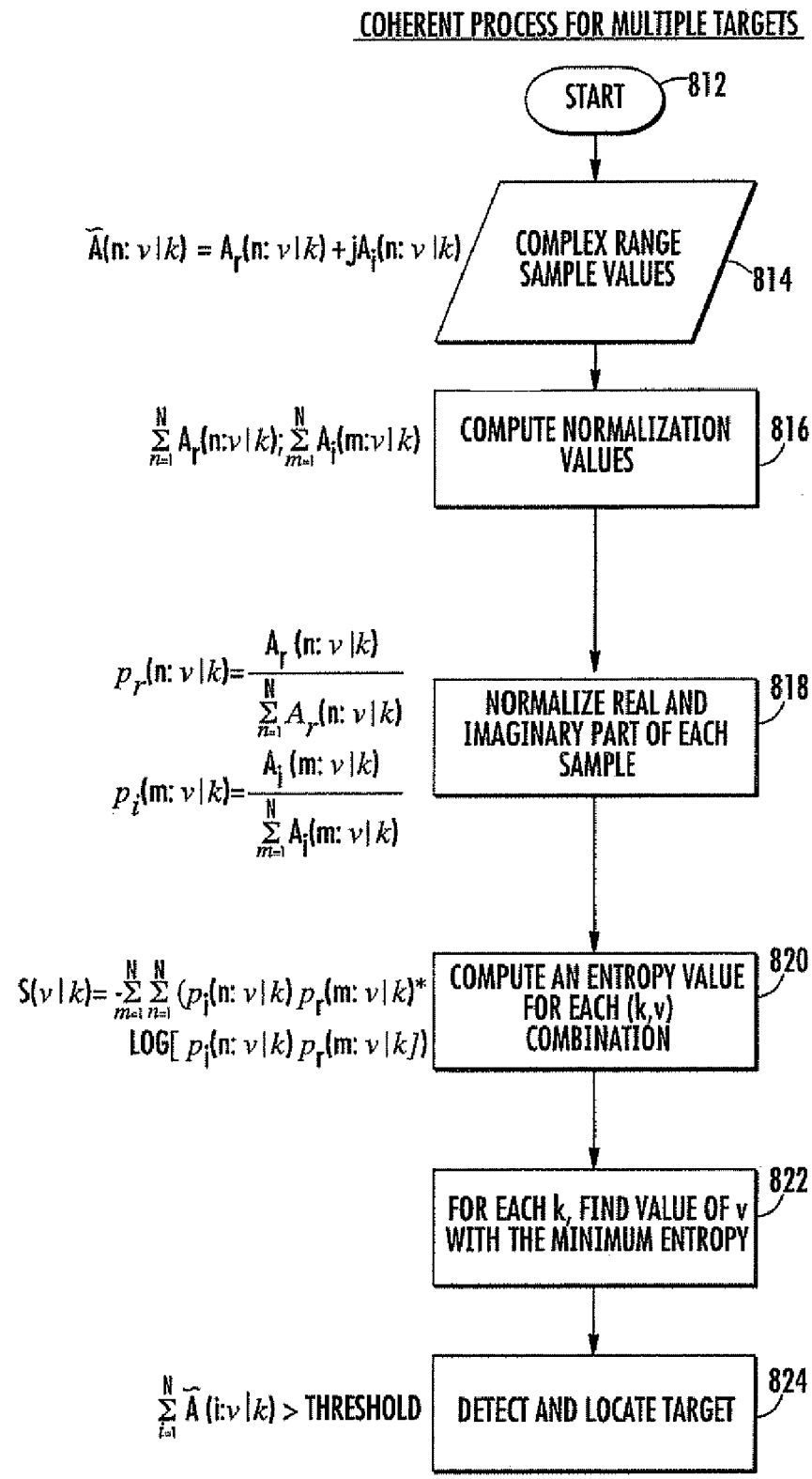
FIG. 8 is a simplified logic flow chart or diagram illustrating the processing associated with coherent integration in the presence of multiple targets.

Equation (35) shows what may be termed noncoherent addition or integration, since the A's are amplitudes. In most modern radars, the complex envelopes can be obtained. Thus, coherent addition is feasible by replacing amplitudes or envelopes by complex envelopes. A complex envelope, of course, includes both amplitude and phase. If there is closing (or opening) target motion with respect to the radar, there will be a pulse-to-pulse phase progression reflecting the changing range. FIG. 8 is a simplified logic flow chart or diagram illustrating coherent processing to detect and locate targets. The logic of FIG. 8 starts at a START block 812. Using the tilde () symbol over a letter to denote the complex envelope, we write $$|\tilde{A}(i:v|k)=A(i:v|k) \quad (36)$$

Equation (33) can be altered to take the complex envelope into account. The coherent pulse processing begins after pulse alignment has been performed for all velocity hypotheses but before pulse-to-pulse integration, as generally described in conjunction with FIG. 6. The samples taken from the output of the receiver 30, as suggested by block 814 of FIG. 8, are complex numbers with real and imaginary parts represented by:

$$\tilde{A}(n:v|k)=A_r(n:v|k)+jA_i(n:v|k) \quad (37)$$

where:

n=1, 2, ..., N, N=number of pulses k=1, 2, ..., $N_R$, $N_R$=number of range samples v=1, 2, ..., V, V=number of closing speed hypotheses We see that the entropy associated with a complex variable is really the joint entropy of the pair ($A_r$, $A_i$).

Now we want to determine the entropy of the sequence of pairs $A_r$ (n: v|k), Ai (n: v|k) The entropy is to be determined by the sequence of pairs $A_r$(n: v|k), $A_i$ (n: v|k). Block 816 of FIG. 8 represents the computation of normalization values $$\sum_{n=1}^{N} A_r(n:v|k) \text{ and } \sum_{m=1}^{N} A_i(m:v|k)$$

Pseudo probabilities are created in block 818 of FIG. 8 by normalizing $$p_r(n:v|k) = \frac{A_r(n:v|k)}{\sum_{n=1}^{N} A_r(n:v|k)}, n=1,\ldots,N \quad (38)$$

$$p_i(m:v|k) = \frac{A_i(m:v|k)}{\sum_{m=1}^{N} A_i(m:v|k)}, m=1,\ldots,N \quad (39)$$

The entropy of the pair sequence

| $A_r$(1:v\|k) | $A_i$(1:v\|k) |
| $A_r$(2:v\|k) | $A_i$(2:v\|k) |
| . | . |
| . | . |
| $A_r$(N:v\|k) | $A_i$(N:v\|k) | is given (block 820) by $$S(v|k) = \\ -\sum_{m=1}^{N}\sum_{n=1}^{N} p_i(n:v|k)p_r(m:v|k)\log[p_i(n:v|k)pr(m:v|k)] \quad (40)$$

Note that the entropy S(v|k) is expressed as a function of closing speed v. Entropy S(v|k) is computed for different values of v for each reference range k in a block 822. That value of v giving a minimum of S(v|k) is selected as being the correct (or best) value of v, so v is chosen such that S(v|k) is a minimum. The denominators in equations (38) and (39) are coherent sums for each value of v. The coherent summing is accomplished by a Doppler filter "tuned" to that closing speed. The Doppler filter outputs, sampled at the end of the sequence, with real and imaginary parts taken, form the denominator in (38) and (39).

As with noncoherent integration, the coherently integrated output for the selected range rate hypothesis of each reference range is tested (block 824 of FIG. 8) against a threshold so that noise exceedances meet the requirements for false alarm probability. The same considerations of threshold versus false alarm probability mentioned previously apply here as well.

A method according to an aspect of the invention is for at least one of detecting and locating a target by the use of radar. The method comprises the steps of transmitting electromagnetic pulses (20) toward a region (18) to be examined, and receiving return pulses (24) from a target (22). Each of the return pulses is sampled in time (31). Each sample has a corresponding range based on the time of the sample, to thereby generate a plurality of pulses including a plurality of different range samples. A set of target speeds (34) is assumed. For each of the assumed target speeds, the amount of temporal (range) shift which should occur between each of the return pulses is determined, to thereby generate plural sets of return pulses with mutual delays, where the mutual delays of each set of return pulses expresses one of the assumed target speeds. The sampled signals at each range are integrated (32) over a set of return pulses, to thereby generate a set of integrated range samples for each assumed target speed. The values of each of the integrated range samples are normalized (418) for each assumed target speed, to thereby generate normalized integrated range samples. For each of the assumed target speeds, entropy is calculated (420) from the normalized integrated range samples for each assumed speed, to thereby generate an entropy value for each assumed speed. That speed estimate resulting in the set of normalized integrated range samples expressing the minimum value of entropy is determined (426). At least one of the presence and location of the target is determined by integrating the return pulses using the speed estimate associated with the minimum value of entropy.

A method for detecting a target by the use of radar according to another aspect of the invention comprises the steps of transmitting electromagnetic pulses (20) toward a region (18) to be examined, and receiving return pulses (24) from a target (22). Each of the return pulses is sampled in time (31). Each sample has a corresponding range based on the time of the sample, to thereby generate a plurality of pulses, each including a plurality of different range samples. A set of target speeds (34) is assumed. For each of the assumed target speeds, the amount of temporal (range) shift which should occur between each of the return pulses is determined, to thereby generate plural sets of return pulses with mutual delays, where the mutual delays of each set of return pulses expresses one of the assumed target speeds. The value of each range sample (714) of each pulse is normalized (718) for each assumed target speed, to thereby generate normalized range samples. For each reference range, an entropy is calculated (720) from the sampled amplitudes of each set of mutually delayed return pulses. That speed estimate resulting in the set of delayed range samples expressing the minimum value of entropy is determined (722). The presence or non-presence of a target in each reference range is determined by integrating the signal amplitudes over the set of return pulses delayed using the speed estimate associated with the minimum value of entropy and comparing the integrated value with a threshold (724). In a mode of this method, the steps of calculating an entropy and integrating the signal over the set of return pulses are performed using the amplitude of each range sample, as opposed to complex range sample values consisting of both amplitude and phase information.

A method according to another aspect of the invention is for detecting a target by the use of radar. The method comprises the steps of transmitting electromagnetic pulses (20) toward a region (18) to be examined, and receiving return pulses (24) from a target (22). Each of the return pulses is sampled in time (31). Each sample has a corresponding range based on the time of the sample, to thereby generate a plurality of pulses, each including a plurality of different range samples. A set of target speeds is assumed (34). For each of the assumed target speeds, the amount of temporal (range) shift which should occur between each of the return pulses is determined, to thereby generate plural sets of return pulses with mutual delays, where the mutual delays of each set of return pulses expresses one of the assumed target speeds. The value of each range sample of each pulse for each assumed target speed is normalized (FIG. 8 block 716), to thereby generate normalized range samples. For each reference range, an entropy is calculated (FIG. 8 block 718) from the complex (amplitude and phase) samples of each set of mutually delayed return pulses. That speed estimate resulting in the set of delayed range samples expressing the minimum value of entropy is determined (FIG. 8 box 720). The presence or non-presence of a target at a range is determined by integrating the complex signals over the set of return pulses delayed using the speed estimate associated with the minimum value of entropy, and comparing the integrated value with a threshold (block 724).

What is claimed is:

1. A method for at least one of detecting and locating a target by the use of radar, said method comprising the steps of:
   transmitting electromagnetic pulses toward a region to be examined;
   receiving return pulses from a target;
   sampling in time each of said return pulses to thereby generate a plurality of pulses, each of said pulses including a plurality of different range samples;
   assuming a set of target speeds;
   for each of said assumed target speeds, determining the amount of temporal shift which should occur between each of said return pulses, to thereby generate plural sets of return pulses with mutual delays, where the mutual delays of each set of return pulses expresses one of said assumed target speeds;
   integrating the signals in each reference range over a set of return pulses, to thereby generate a set of integrated range samples for each assumed target speed;
   normalizing the values of each of said integrated range samples for each assumed target speed, to thereby generate normalized integrated range samples;
   for each of said assumed target speeds, calculating entropy from said normalized integrated range samples for each assumed speed, to thereby generate an entropy value for each assumed speed;
   determining that speed estimate resulting in the set of normalized integrated range samples expressing the minimum value of entropy; and
   determining at least one of the presence and location of said target by integrating said return pulses using the speed estimate associated with said minimum value of entropy.

2. A method for detecting a target by the use of radar, said method comprising the steps of:
   transmitting electromagnetic pulses toward a region to be examined;
   receiving return pulses from a target;
   sampling in time each of said return pulses to thereby generate a plurality of pulses consisting of a plurality of different range samples;
   assuming a set of target speeds;
   for each of said assumed target speeds, determining the amount of temporal shift which should occur between each of said return pulses, to thereby generate plural sets of return pulses with mutual delays, where the mutual delays of each set of return pulses expresses one of said assumed target speeds;
   normalizing the value of each range sample of each pulse for each assumed target speed, to thereby generate normalized range samples;
   for each reference range, calculating an entropy from the normalized sample amplitudes of each set of mutually delayed return pulses;
   determining that speed estimate resulting in the set of delayed range samples expressing the minimum value of entropy; and
   determining the presence or non-presence of a target at each reference range by integrating the signal amplitudes over the set of return pulses delayed using the speed estimate associated with the minimum value of entropy.

3. A method according to claim 2, wherein said steps of calculating an entropy and integrating the signal over the set of return pulses are performed using complex values of each range sample.

4. A method for detecting a target by the use of radar, said method comprising the steps of:
   transmitting electromagnetic pulses toward a region to be examined;
   receiving return pulses from a target;
   sampling in time each of said return pulses to thereby generate a plurality of pulses consisting of a plurality of different range samples;
   assuming a set of target speeds;
   for each of said assumed target speeds, determining the amount of temporal shift which should occur between each of said return pulses, to thereby generate plural sets of return pulses with mutual delays, where the mutual delays of each set of return pulses expresses one of said assumed target speeds;
   normalizing the value of each range sample of each pulse for each assumed target speed, to thereby generate normalized range samples;
   for each reference range, calculating an entropy from the normalized complex samples of each set of mutually delayed return pulses;
   determining that speed estimate resulting in the set of delayed range samples expressing the minimum value of entropy; and
   determining the presence or non-presence of a target at each reference range by integrating the complex samples over the set of return pulses delayed using the speed estimate associated with the minimum value of entropy.

* * * * *